Jan. 6, 1942.  C. J. WERNER  2,269,069
ELECTRIC MOTOR
Filed Dec. 19, 1938

INVENTOR
CALVIN J. WERNER
BY
Spencer, Hardman and Fehr
ATTORNEYS

Patented Jan. 6, 1942

2,269,069

UNITED STATES PATENT OFFICE 2,269,069

ELECTRIC MOTOR

Calvin J. Werner, Dayton, Ohio, assignor to General Motors Corporation, Detroit, Mich., a corporation of Delaware Application December 19, 1938, Serial No. 246,566

7 Claims. (Cl. 172—279)

This invention relates to improvements in electric motors, particularly to split-phase electric motors adapted to be operated at different speeds.

It is among the objects of the present invention to provide an electric motor of simple structure and design which is capable of operating at different speeds dependent upon its connections with the power line.

A further object of the present invention is to provide an electric motor of the split-phase type, having a minimum number of windings and a control device whereby the motor may be started and then will operate at different speeds dependent upon its connections with a power line.

The term "split-phase" as used in the present invention is intended to define electric motors wherein phase displacement of the currents within the running and starting windings are obtained by means of resistances, condensers or reactors or combinations thereof.

In the split-phase motor of the present invention one of the main or running windings has the same number of poles as the starting winding and is angularly displaced therefrom in order to obtain the proper starting torque. The other running winding of the motor has a different number of poles.

Further objects and advantages of the present invention will be apparent from the following description reference being had to the accompanying drawing wherein a preferred embodiment of the present invention is clearly shown.

Figure 1:
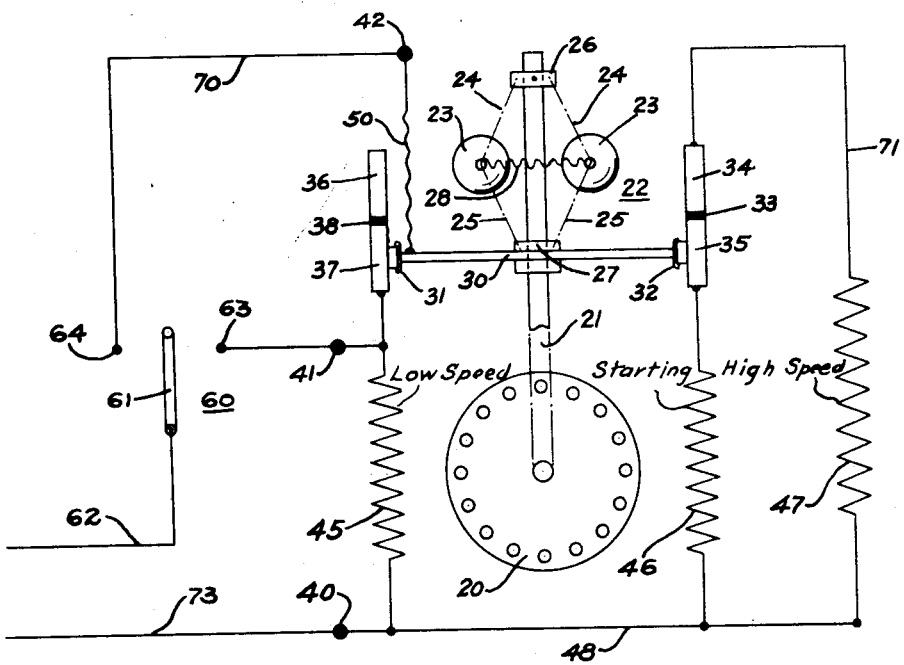
Figure 1 is a diagrammatic view of one form of the invention.

Referring to the drawing and particularly to Figure 1 thereof, the numeral 20 designates the rotor of the electric motor. This rotor has a shaft 21. Associated with this shaft 21 and driven thereby is a controller designated as a whole by the numeral 22. This controller may be of any suitable speed controlled type, being provided with a circuit-controlling mechanism which, in one position, completes certain circuits and when moved by the motor, as it attains a predetermined speed, is adapted to complete another circuit. For purposes of illustration the controller 22 is shown in the present drawing to include centrifugal weights or balls 23 pivotally secured to ends of arms 24 and 25. The opposite ends of said arms 24 and 25 are secured to collars 26 and 27 respectively, which collars are mounted upon shaft 21. Collar 26 is secured to the shaft 21 so that it can not move longitudinally relative thereto; however, collar 27 is mounted so that it may slide longitudinally on the shaft 21. A spring 28 urges the balls 23 toward each other and toward the shaft 21. A movable contact or bridging arm 30 is insulatingly secured to the collar 27, this arm extending in opposite directions from said collar. Each end of the arm has a bridging contact element secured thereto, the one at one end being designated by the numeral 31, the one at the opposite end by the numeral 32. These contact elements are termed "bridging contact elements" because the contact element 32 in particular, is designed to bridge the insulating member 33 and concurrently engage both stationary contacts 35 and 34 for an interval during the movement of the arm 30 from its normal position into the position in which its bridging element 32 will solely engage the stationary contact 34. The controller has two sets of oppositely disposed stationary contacts. The stationary contacts on one side of the controller are designated by the numerals 34 and 35. These contacts are insulated from each other by the insulating member 33. The opposite stationary contacts are designated by the numerals 36 and 37, each separated from each other by the insulating member 38. Normally stationary contacts 35 and 37 are engaged by the bridging members 32 and 31 respectively.

The motor is provided with three terminals 40, 41 and 42, which may be carried by the motor housing in any suitable manner. Three field windings 45, 46 and 47 are provided in this motor. The winding 45 in Figure 1 is the "low speed running winding." The one designated by the numeral 46 is the "low speed phase" or the "starting winding." The numeral 47 designates the "high speed running winding." It will be noted that one end of each of these windings is connected to a common lead 48, which in turn is connected to the motor terminal 40. The opposite end of the "low speed running winding" 45 is connected with the motor terminal 41. The opposite end of the "low speed phase" or "starting winding" 46 is connected with the stationary contact 35 of the controller while the opposite end of the "high speed running winding" 47 is connected with the stationary contact 34 of the controller by wire 71. Motor terminal 42 is connected with the bridging arm 30 of the controller through a flexible connection 50 what may be commonly termed a "pigtail."

The motor may be connected to a power line to run at high speed only. It also may be connected to the power line to run at low speed only. The third alternative is to connect the motor with the power line so that it may run at low or high speed as desired. To illustrate the method of connecting the motor with the power line for the purposes of operating at low or high speed applicant has shown a selector switch designated by the numeral 60. This switch has a movable contact element 61 connected with one side 62 of the power line. This contact element 61 may be moved into engagement with either of the stationary contacts 63 or 64 of this switch. Terminal 63 is connected with the motor terminal 41 and the terminal 64 is connected with the motor terminal 42 by wire 70. The motor terminal 40 is connected with the opposite side 73 of the power line.

When the motor is connected with the power line as shown in Figure 1 it will operate in the following manner:

If the user desires to operate the motor at low speed he will actuate the movable contact element 61 of the selector switch 60 into engagement with the stationary contact 63. This will complete the circuit to the low speed running winding 45 as follows:

Current will flow from the power line 62 through the movable contact 61 into the stationary contact 63 across the wire to the stationary contact 41 of the motor then through the low speed running winding 45 to the common line 48 into the motor terminal 40 to the power line 73 connected thereto. It will be noted that the circuit through the low speed running winding is not conducted across the controller 22. The circuit to the low speed phase or starting winding 46 is completed in the following manner: from the motor terminal 41 to the stationary contact 37 of the controller thence through the bridging element 31 across the contact arm 30 to the opposite bridging element 32 electrically engaging the stationary contact 35. From the contact 35 through the low speed phase or starting winding 46 to the common wire 48, which has been mentioned heretofore is connected with the common terminal 40 of the motor, thence to the opposite side 73 of the line. With these two circuits completed the motor will start to operate. After the motor is operating properly and some time before it reaches its maximum low speed the controller 22, in response to its centrifugal element, will be shifted from the circuit-closing position as shown in Figure 1 into a position in which the bridging elements 31 and 32 will engage stationary contacts 36 and 34 respectively. As the bridging contact element 32 is moved from stationary contact 35 toward stationary contact 34, it will, for a short interval engage both stationary contacts 35 and 34 so as to maintain the circuit including the starting winding 46 until the circuit including the running winding 47 has been established after which the continued movement of element 32 will entirely disengage the stationary contact 35. Now the circuit to the low speed phase or starting winding is broken completely. However, the circuit to the low speed running winding is maintained for, as has been mentioned heretofore, the operation of the controller has no effect whatsoever upon the circuit to this winding. Under these circumstances the motor will operate at its predetermined low speed.

Suppose now the user desires to operate the motor at its maximum high speed. To do this he moves the movable contact 61 of the selector switch into engagement with the stationary contact 64 thereof. Now the following circuits are closed. From the power line 62 across the movable contact 61 to the stationary contact 64 through wire 70 to the motor terminal 42 which, as has been previously described, is connected with the contact arm 30 of the controller by the flexible or pigtail connection 50. Two circuits are completed by the contact arm 30. The first, through the bridging element 31 to the stationary contact member 37 of the controller thence through the low speed running winding 45 to the common wire 48 connected to the motor terminal 40 which in turn is in electrical connection with the opposite side 73 of the power line. The second circuit from the contact arm 30 is completed through the bridging contact 32 stationary contact element 35 of the controller, thence through the low speed phase or starting winding 46 to the common wire 48 to motor terminal 40 and opposite side of the line 73. This completes the same starting circuit as described heretofore. When the motor reaches a predetermined speed the centrifugally actuated controller 22 will move the contact arm 30 from the position as shown in Figure 1, into a position in which its bridging contacts 31 and 32 will engage the stationary contacts 36 and 34 respectively. Now the connection to the low speed running winding 45 and the low speed phase or starting winding 46 is broken and the circuit to the high speed running winding 47 will be completed in the following manner: from the line 62 of the power circuit to the movable contact 61, thence through the stationary terminal 64, through wire 70 to the motor terminal 42, thence through the pigtail connection 50 to the contact arm 30 of the controller, thence through the bridging contact 32 of said arm to the stationary contact 34 through wire 71 to the high speed running winding 47 across the common wire 48 to the motor terminal 40 and to the opposite side 63 of the power line.

To operate the motor only at low speed the user need only connect the power lines 62 and 73 with the motor terminals 41 and 40 respectively. On the other hand if the user desires to operate the motor only at high speed then the power line 62 need only be changed to connect with the terminal 42 on the motor.

Figure 2:
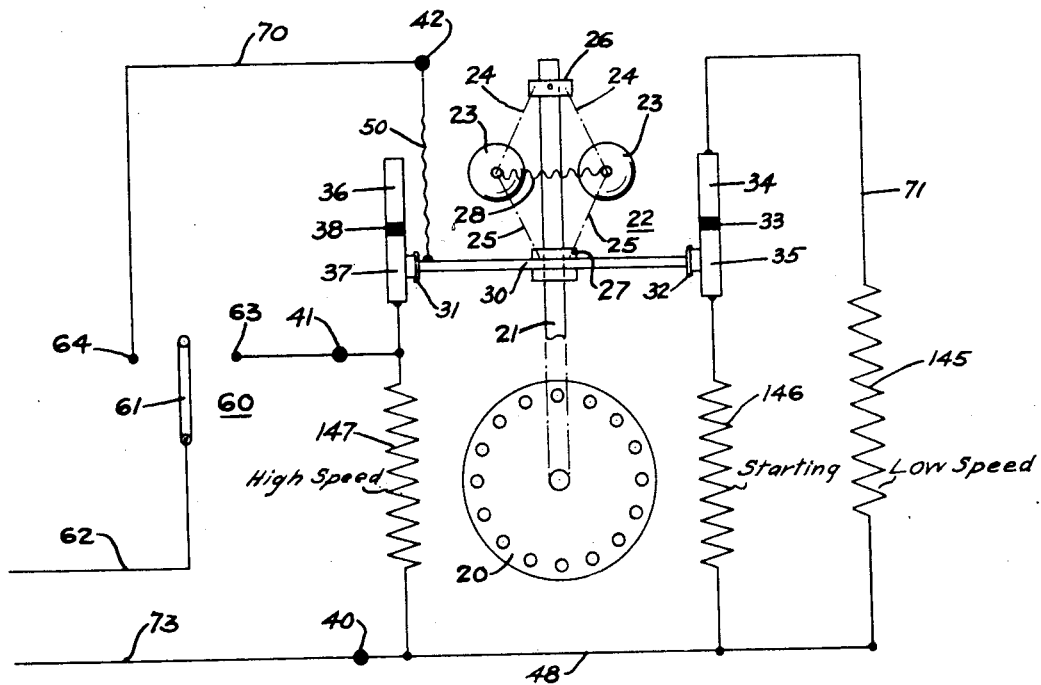
Figure 2 is a diagrammatic view of a modified form of the invention.

The circuit connections of the modified form of the invention shown in Figure 2, differ from that of Figure 1. The controller 22 and its parts are identical in this instance. The "low speed running winding" 145, the "high speed phase or starting winding" 146 and the "high speed running winding" 147 all have one end thereof connected to the common wire 48 which as in Figure 1 is connected to the motor terminal 40. The opposite end of the low speed running winding 145 is connected to wire 71 with the stationary terminal or contact 34 of the controller 22. The opposite end of the high phase starting winding 146 is connected with the stationary contact 35 of the controller while the opposite end of the high speed running winding 47 is connected to the motor terminal 141. As in the preferred form motor terminal 41 is also electrically connected to the stationary contact 37 of the controller. The movable contact arm 30 thereof is connected with the motor terminal 42 by the flexible or pigtail connection 50.

This modified form of the invention operates in the following manner: To operate the motor at low speed the user actuates the movable contact 61 of the selector switch 60 so that it will engage the stationary contact 64 thereof. This completes the following circuit from the side 62 of the power line to the movable contact 61, thence to the terminal 64 through the wire 70 to the motor terminal 42, thence across the pigtail connection 50 to the movable contact arm 30 of the centrifugally controlled motor switch 22. From here the circuit will divide one portion flowing through the bridging contact 31 to the stationary contact 37, thence through the high speed running winding 147 to the common wire 48, motor terminal 40 to the opposite side 63 of the power line. The other portion of this circuit is completed from the movable contact arm 30 of the centrifugally actuated switch 22 to the bridging contact 32 and thence through the stationary contact 35 of the switch to the high speed phase or starting winding 146 to the common line 48, thence to the motor terminal 40 and the opposite side of the line. This completes the high speed starting and running circuits. Now when the motor reaches a predetermined speed its centrifugally operated controller 22 will shift its arm 30 from the circuit connection as shown in Figure 2 into the position in which the bridging contacts 31 and 32 thereof will engage the stationary terminals 36 and 34 respectively. This completely breaks the connection through the high speed running winding 147 and the high speed phase or starting winding 146 and completes the circuit from the motor terminal 42 through the pigtail 50 across arm 30 to the stationary contact 34, thence to the wire 71, low speed running winding 145 to the common wire 148, motor terminal 40, the opposite side 73 of the power line. With this circuit completed the motor will operate at low speed.

When the user desires to operate this motor at high speed, however, he moves the movable contact 61 of selector switch 60 into engagement with its stationary contact 63. Now the following circuits are completed: From the line 62 of the main power circuit to the movable contact 61 to the stationary contact 63, thence to the motor terminal 41 which is connected with the high speed running winding 147, through this winding to the common wire 48, thence to the motor terminal 40 and the opposite side 73 of the power line. The following branch circuit is also completed: from the motor terminal 41 to the stationary contact element 37 of the controller 22, thence through the bridging element 31 across the controller arm 30 to the bridging element 32, thence through the stationary contact 35, high speed phase or starting winding 146 through the common wire 48 to the motor terminal 40 and back to the opposite side 73 of the power line. As before, this completes the starting circuit for the motor and again, as soon as it reaches a predetermined speed, the controller 22 will move its arm 30 from the circuit-closing position shown in Figure 2 into a position in which the bridging contacts again engage stationary contacts 36 and 34. This shifting of the bridging elements 31 and 32 out from engagement with the stationary contacts 37 and 35 respectively, of the controller, will entirely disconnect the high speed phase or starting winding 146. The high speed running winding 147 will remain effective for it does not depend upon the centrifugal switch or controller 22 to complete its circuit, when the movable contact 61 of the selector switch 60 is in circuit-engaging position with the stationary terminal 63. Thus, under these circumstances the motor will now operate at high speed.

From the aforegoing it may clearly be seen that applicant has provided an electric motor adapted to run at either high or low speed, said motor having one starting winding and two running windings, one a low speed the other a high speed running winding. In the motor he has provided a single speed-responsive motor-actuated switch adapted properly to shift connections at predetermined motor speeds. The circuits are so arranged that the controller is adapted to render the starting winding and the same running winding effective for starting purposes regardless of whether the high or low speed running winding circuits are closed. Thus starting circuits are completed when the controller is in normal position. When shifted at a predetermined motor speed it renders the starting winding entirely ineffective and brings the proper running winding into operative circuits.

From the aforegoing it is evident that applicant has provided two speed motor capable of performing its function with a minimum number of elements. His motor comprises a single controller switch, a single starting winding and a single running winding, one for each speed at which the motor is to operate.

While the form of embodiment of the present invention as herein disclosed constitutes a preferred form, it is to be understood that other forms might be adopted, all coming within the scope of the claims which follow.

What is claimed is as follows:

1. A single phase, split-phase, two speed electric motor having a rotor, a stator provided with a starting winding and first and second running windings, said starting winding being angularly displaced relative to said running windings and having a pole number equal to that of the first running winding, the second running winding having a different pole number, a switch having at least three stationary contacts and a movable bridging member normally engaging but two of said three contacts, means actuated by said motor for moving said member away from said two contacts into engagement with the third of said contacts when said rotor reaches a predetermined speed, said motor having only three external terminals, one end of each of said windings being connected together and to a first of said terminals, the other end of the first running winding being connected to a second of said terminals and to one of said two stationary contacts of the switch, the other end of the starting winding being connected to the other of said two stationary contacts of the switch, the other end of the second running winding being connected to the third contact of said switch, the bridging member being connected to the third of said terminals, means for controlling said motor comprising means for connecting one conductor of a single phase source to the said first terminal, and for selectively connecting the other conductor of the source to either one of the other two terminals to determne the runnng speed of the motors.

2. A single phase, split-phase, two speed electric motor having a rotor, a stator provided with a starting winding and first and second running windings, said starting winding being angularly displaced relatively to said running windings and having a pole number equal to that of the first running winding, the second running winding having a different pole number, a switch having at least three stationary contacts and a movable bridging member normally engaging but two of said three contacts, means actuated by said motor for moving said member away from said two contacts into engagement with the third of said contacts when said motor reaches a predetermined speed, said motor having only three external terminals, one end of each of said windings being connected together and to a first of said terminals, which terminal may be connected to one line of a single phase source of current, the other end of the first running winding being connected to a second of said terminals and to one of said two stationary contacts of the switch, the other end of the starting winding being connected to the other of said two stationary contacts of the switch, the other end of said second running winding being connected to the third contact of said switch, the bridging member being connected to the third of said terminals, the second or third motor terminals to be selectively connected to the other line of a single phase source of current to determine the operating speed of the motor.

3. A single phase, split-phase, two speed electric motor having a rotor, a stator provided with a starting winding and first and second running windings, said starting winding being angularly displaced relatively to said running windings and having a pole number equal to that of the first running winding, the second running winding having a different pole number, a switch having at least three stationary contacts and a movable bridging member normally engaging but two of said three contacts, means acting in response to the motor rotor reaching a predetermined speed for moving said bridging member away from said two contacts into engagement with the third of said contacts, said motor having only three external terminals, one end of each of said windings being connected together and to a first of said terminals, which terminal may be connected to one line of a single phase source of current, the other end of the first running winding being connected to a second of said terminals and to one of said two stationary contacts of the switch, the other end of the starting winding being connected to the other of said two stationary contacts of the switch, the other end of said second running winding being connected to the third contact of said switch, the bridging member being connected to the third of said terminals, the second or third motor terminals to be selectively connected to the other line of a single phase source of current to determine the operating speed of the motor.

4. A single phase, split-phase, two speed electric motor having a rotor, a stator provided with a starting winding and first and second running windings, said starting winding being angularly displaced relatively to said running windings and having a pole number equal to that of the first running winding, the second running winding having a different pole number, a switch having at least three stationary contacts and a movable bridging member normally engaging but two of said three contacts, one of said contacts being permanently, electrically connected to one end of the starting winding, the other of said two contacts being permanently, electrically connected to one end of a running winding, the third stationary contact being permanently, electrically connected to one end of the other running winding, means actuated in response to the rotor of the motor reaching a predetermined speed for moving the bridging member from engagement with said two stationary contacts into sole engagement with the third stationary contact and three external terminals on the motor, one of which is electrically connected to the other end of all three motor windings, and which may be connected to one side of a source of single phase current, the second terminal being permanently connected with the contact normally engaged by the bridging member and connected to the one running winding, the third terminal being connected to the bridging member, said second or third terminal to be selectively connected to the other side of the source of single-phase current to determine the operating speed of the motor.

5. In a split-phase, two speed electric motor having a rotor, a stator provided with equal pole starting and running windings, angularly displaced relatively to each other and another running winding having a different number of poles than said first two windings, three external terminals on the motor, the first and second terminals having one running winding permanently connected therebetween, the first terminal being permanently electrically connected to one end of the starting and other running winding, a controller switch comprising at least three stationary contacts each of which is permanently electrically connected to the other end of a respective motor winding, said switch also comprising a shiftable bridging member normally engaging and electrically connecting the stationary contacts connected respectively to the starting winding and the second terminal and the one running winding, said bridging member being electrically connected to the third terminal, and means automatically responsive to predetermined motor operation for actuating said bridging member out of its normal position and into sole engagement with the third stationary contact.

6. In a split-phase, two speed electric motor having a rotor, a stator provided with equal pole starting and running windings angularly displaced relatively to each other and another running winding having a different number of poles than said first two windings, three external terminals only, the first and second of which having one running winding connected permanently therebetween, said first terminal also having one end of each of the other two windings electrically connected thereto, a switch having three stationary contacts and a movable bridging member which is electrically connected to the third terminal and which normally connects two of said stationary contacts one of which is permanently connected to the second terminal, the other permanently connected with the other end of the starting winding, the third stationary contact being permanently connected to the said other running winding said bridging member being adapted to engage all three stationary contacts simultaneously for a short interval as said member is moved from normal engagement with the said two stationary contacts into sole engagement with the third stationary contact and means for automatically actuating said bridging member as the motor is operating predeterminately.

7. In a split-phase, two speed electric motor having a rotor, a stator provided with three windings, first of which is a starting winding, the second a running winding, and the third a running winding, the first and second windings, having equal poles and being angularly displaced relatively to each other, the third winding having poles differing in number than said first two windings, three external terminals only on the motor, the first and second terminals having the said second winding connected permanently therebetween, said first terminal also having one end of the first and third motor windings connected thereto, a switch having three stationary contacts and a shiftable bridging member which is electrically connected to the third motor terminal and which normally engages and electrically connects two of said stationary contacts one of which is permanently connected to the second terminal, the other to the other end of the starting winding, said bridging member being adapted when shifted from normal position into sole engagement with the third stationary contact, to engage the said third contact before breaking engagement with the other two contacts, the said third contact being permanently connected with the other end of the third motor winding, and means for predeterminately actuating said bridging member as the motor is operating.

CALVIN J. WERNER.